United States Patent
Sankrithi et al.

(10) Patent No.: US 8,788,122 B1
(45) Date of Patent: Jul. 22, 2014

(54) WING LOAD ALLEVIATION METHODS AND APPARATUS

(75) Inventors: Mithra M. K. V. Sankrithi, Lake Forest Park, WA (US); Joshua Frommer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 13/594,446

(22) Filed: Aug. 24, 2012

(51) Int. Cl.
*G01C 23/00* (2006.01)
*G01M 5/00* (2006.01)
*G01C 21/16* (2006.01)

(52) U.S. Cl.
CPC ........... *G01M 5/0016* (2013.01); *G01M 5/0041* (2013.01); *G01C 21/165* (2013.01)
USPC .................. 701/3; 701/13; 701/24; 701/494; 244/158.1

(58) Field of Classification Search
USPC .................. 701/3, 13, 24, 494; 244/158.1
See application file for complete search history.

(56) References Cited

U.S. PATENT DOCUMENTS

| 7,744,038 | B2 | 6/2010 | Sankrithi et al. |
| 7,900,877 | B1 | 3/2011 | Guida |
| 7,988,099 | B2 | 8/2011 | Bray |
| 2008/0116322 | A1 * | 5/2008 | May ........................... 244/199.4 |
| 2011/0313614 | A1 * | 12/2011 | Hinnant et al. ................. 701/33 |

FOREIGN PATENT DOCUMENTS

EP 2233395 9/2010

* cited by examiner

*Primary Examiner* — Gertrude Arthur Jeanglaude
(74) *Attorney, Agent, or Firm* — Hanley, Flight & Zimmerman, LLC

(57) ABSTRACT

Wing load alleviation methods and apparatus are disclosed. An example method includes collecting data related to a condition of an aircraft; and when a condition identifier implemented via a logic circuit indicates that the condition comprises a high load condition, automatically generating a plurality of control signals to coordinate a first deflection of a first control surface of a configurable winglet and a second deflection of a second control surface of a wing adjacent to the winglet.

19 Claims, 9 Drawing Sheets

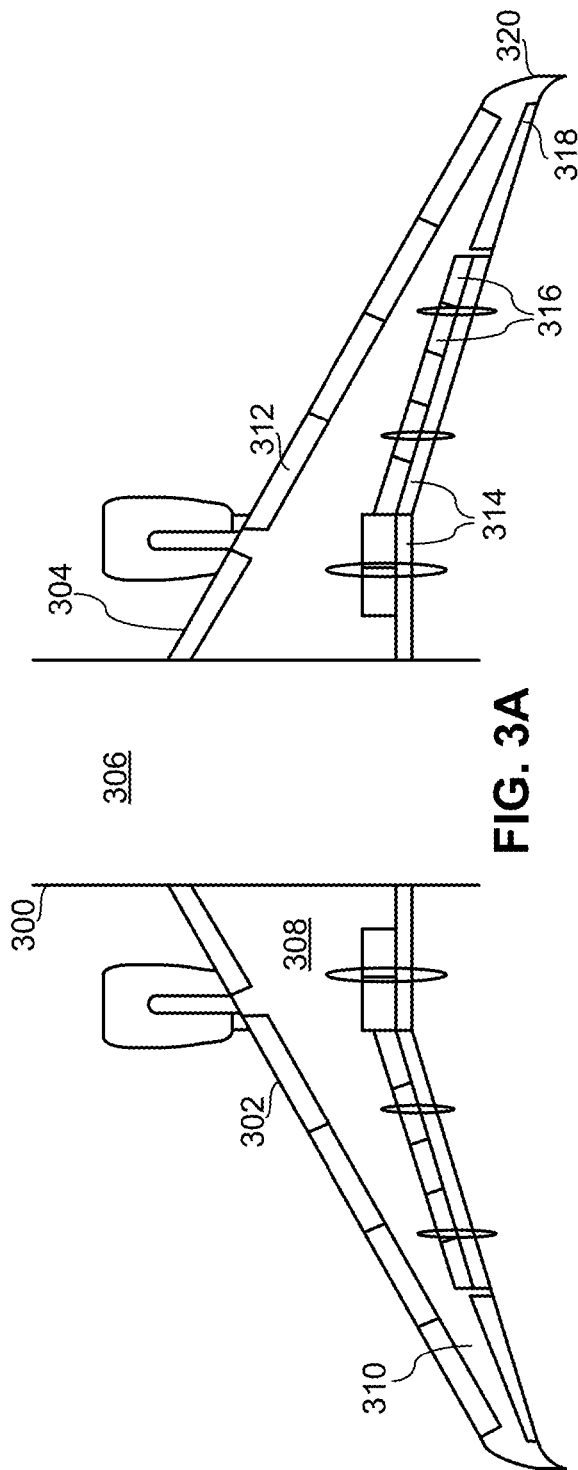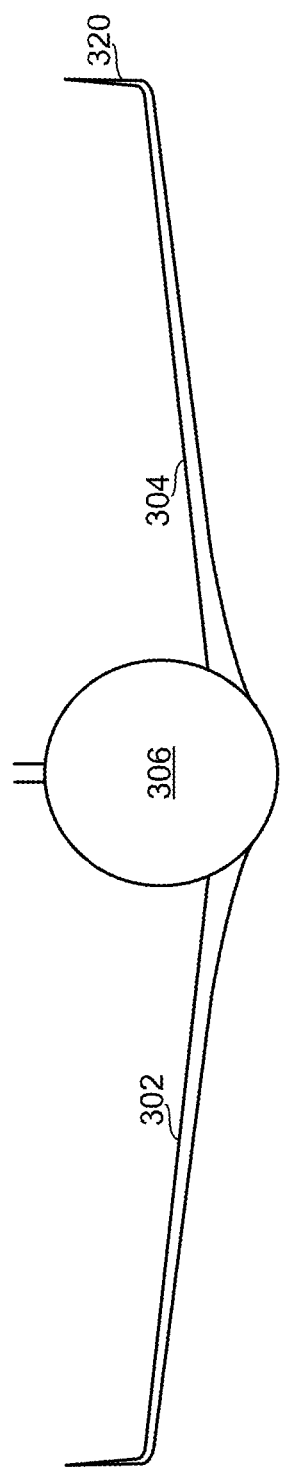

US 8,788,122 B1

WING LOAD ALLEVIATION METHODS AND APPARATUS

FIELD OF THE DISCLOSURE

This disclosure relates generally to aircrafts and, more particularly, to wing load alleviation methods and apparatus.

BACKGROUND

Aircraft wings include a plurality of control surfaces that are configurable to alter one or more aerodynamic characteristics of the wings. An operator, such as a pilot or auto-pilot system, configures the control surfaces of the wings to support the aircraft during one or more maneuvers. For example, a set of flaps can be used during landing to support the deceleration of the aircraft.

SUMMARY

Wing load alleviation methods and apparatus are disclosed. A disclosed example method includes collecting data related to a condition of an aircraft; and when a condition identifier implemented via a logic circuit indicates that the condition exists, automatically generating a plurality of control signals to coordinate a first deflection of a first control surface and a second deflection of a second control surface.

A disclosed example aircraft includes a winglet having a first control surface, the winglet being mounted to a wing. The example aircraft also includes a second control surface. The example aircraft also includes a sensor to collect data related to a condition of the aircraft. The example aircraft also includes a signal generator to coordinate a deflection of the first control surface of the winglet and a deflection of the second control surface in response to a detection of the condition.

A disclosed example apparatus includes a condition identifier to, via logic circuit, determine a mode of an aircraft; and a signal generator to respond to the determined mode of the aircraft by conveying signals to actuators of the aircraft, wherein the signal generator is to respond to the mode being a flight condition mode comprising a non-cruise mode by conveying a first signal to a first actuator associated with a first control surface of a wing to cause the first control surface to deflect, and conveying a second signal to a second actuator associated with a winglet to cause a second control surface of the winglet to deflect.

BRIEF DESCRIPTION OF THE DRAWINGS

FIG. 3A is a plan view of an example pair of wings of an example aircraft.

FIG. 3B is a front view of the example pair of wings of FIG. 3A in a first example configuration.

Figure 1A:
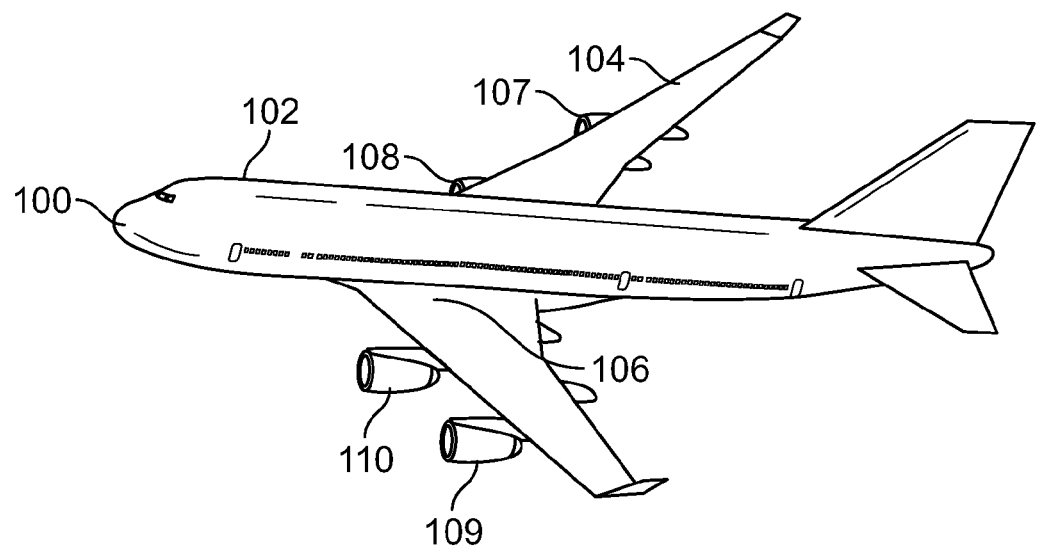
FIGS. 1A-1D are illustrations of example aircraft on which example methods and apparatus disclosed herein may be implemented.

To clarify multiple layers and regions, the thicknesses of the layers are enlarged in the drawings. Accordingly, the structures illustrated in the drawings are not drawn to scale and, instead, are drawn to clarify the teachings of this disclosure. Wherever possible, the same reference numbers will be used throughout the drawing(s) and accompanying written description to refer to the same or like parts. As used in this patent, stating that any part (e.g., a layer, film, or area) is in any way positioned on (e.g., positioned on, located on, disposed on, attached to, or formed on, etc.) another part, means that the referenced part is either in contact with the other part, or that the referenced part is adjacent the other part with one or more intermediate part(s) located therebetween. Stating that any part is in contact with another part means that there is no intermediate part between the two parts.

DETAILED DESCRIPTION

FIGS. 1A-1D show an example aircraft in which example methods and apparatus disclosed herein may be utilized. While example aircraft are shown in FIGS. 1A-D, the example methods and apparatus disclosed herein may be implemented in connection with other types of aircraft, watercraft (e.g., flying boats, seaplanes, etc.), and/or any other type of craft. The example aircraft 100 of FIG. 1A is a commercial airplane having a fuselage 102 that is typically used to carry payload, such as passengers and/or cargo. The example aircraft 100 includes right and left wings 104 and 106. In some instances, the aircraft 100 includes left and right portions of a one-piece wing. Example types of wings include dihedral wings, anhedral wings, polyhedral wings, aft-swept wings, forward-swept wings, aerodynamically-twisted wings, blended wings, etc. The right and left wings 104 and 106 each have an inboard portion and an outboard portion. The inboard portions of the wings 104 and 106 are closer to the fuselage 102 than the outboard portions. A propulsion system including propulsors 107-110 (e.g., jet engines, turbofan engines, geared turbofan engines, etc.) coupled to the wings 104 and 106 provides the aircraft 100 with thrust. In some instances, the propulsors 108 and 110 are not mounted to the wings 104 and 106, but are positioned elsewhere on the aircraft 100 (e.g., a front or rear of the fuselage 102). As described in greater detail below, the wings 104 and 106 include a plurality of control surfaces (e.g., flaps, spoilers, ailerons, rudders, etc.) that are controlled by pilots and/or an auto-pilot system to operate the aircraft 100.

Figure 1B:
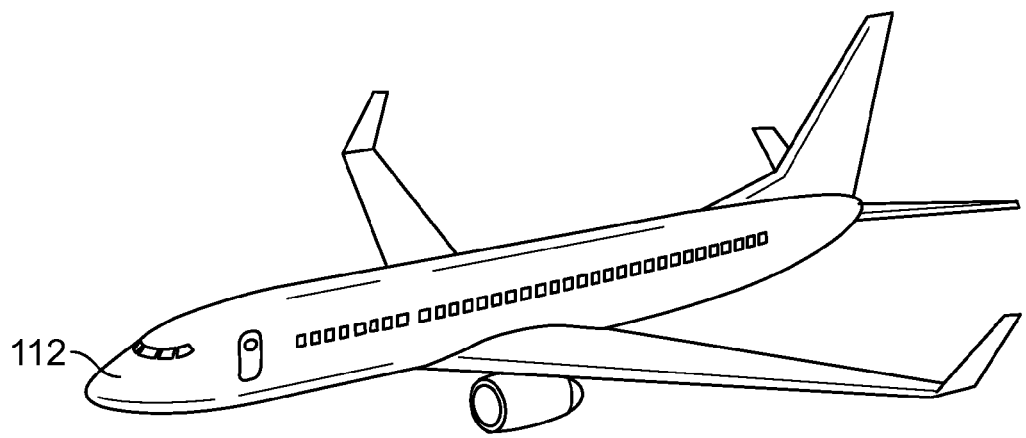
Figure 1C:
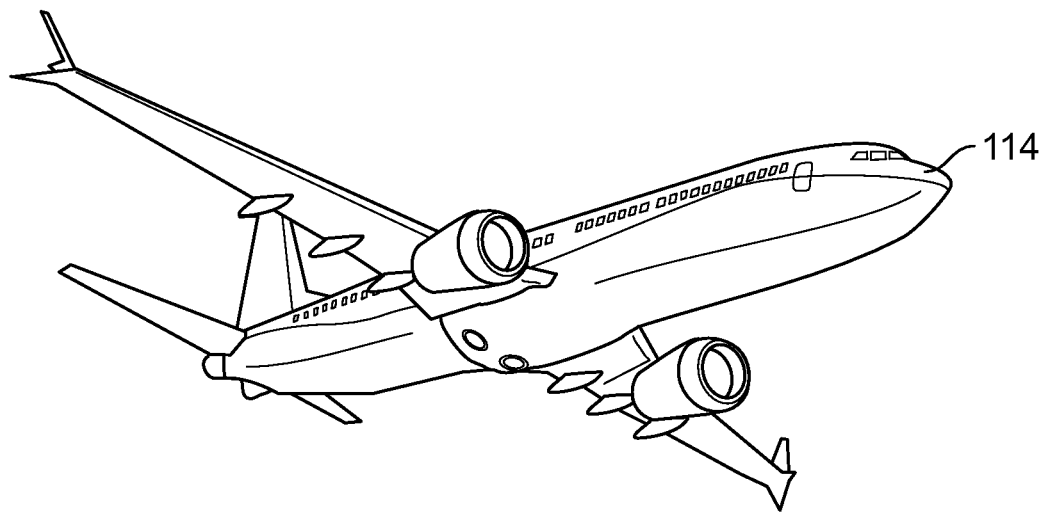
Figure 1D:
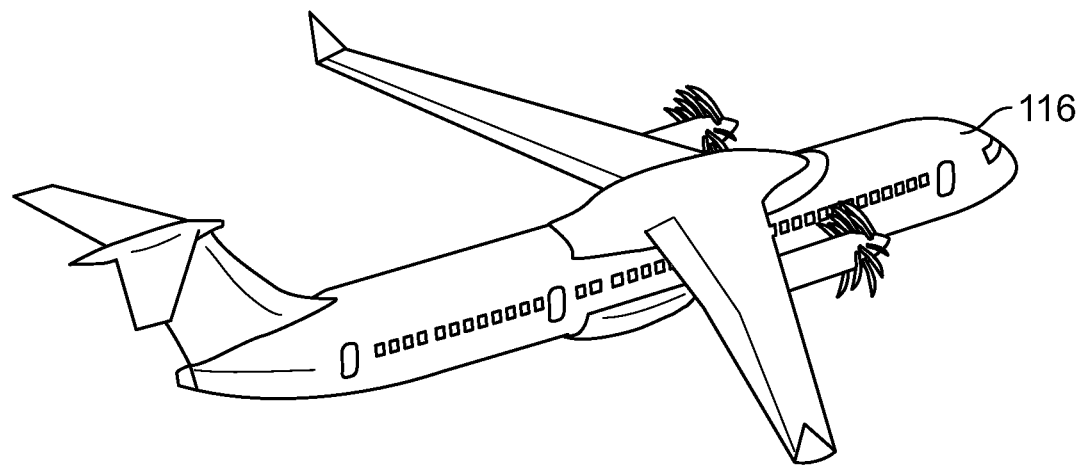

FIG. 1B shows another example aircraft 112 having propulsors mounted at different locations than the example aircraft 100 of FIG. 1A. FIG. 1C shows another example aircraft 114. In the example of FIG. 1C, each wing is outfitted with differently shaped winglets than the example aircraft 100 and 112 of FIGS. 1A and 1B. FIG. 1D shows another example aircraft 116. The example aircraft 116 of FIG. 1D includes a different type of propulsion system (e.g., propeller, unducted fan, open fan or open fan driven) than the example aircraft 100, 112 and 114 of FIGS. 1A-1C. While the example aircraft 100 of FIG. 1A is discussed in further detail below, the example methods and apparatus disclosed herein can be implemented in connection with any of the example aircraft 110, 112, 114 and/or 116 of FIGS. 1A-1D and/or additional or alternative craft.

Different forces are exerted on different portions of the aircraft 100 of FIG. 1A depending on, for example, a stage of flight of the aircraft 100 and/or external factors. For example, the wings 104 and 106 of the aircraft 100 experience varying amounts of bending loads depending on current conditions of the aircraft 100. The magnitude of the bending loads imparted on the wings 104 and 106 is increased when, for example, the aircraft 100 undergoes a high load factor condition such as a high maneuver load condition or a high gust condition. For example, the wings 104 and 106 experience bending loads of a first magnitude when the aircraft 100 is in a cruise condition and bending loads of a second, greater magnitude when the aircraft 100 is in a non-cruise condition. Certain aspects of the aircraft 100 may increase the bending loads experienced by the wings 104 and 106. For example, while winglets positioned at ends of the wings 104 and 106 reduce the induced drag of the aircraft 100 and improve the lift-to-drag ratio of the aircraft 100 in a first set of conditions, winglets can increase the bending loads experienced by the wings 104 and 106 in a second set of conditions. For example, the first set of conditions could include normal flight conditions such as cruise, climb and descent with incremental load factors of less than a fraction of 1 G (e.g., half of 1 G), where 1 G is the acceleration of gravity. The second set of conditions could include, for example, maneuvering and/or gust conditions with current and/or anticipated incremental load factors more than a fraction of 1 G (e.g., half of 1 G), or within some threshold of limit load factor, or within some threshold of ultimate load factor, and/or other conditions. The second set of conditions may occur, for example, during cruise conditions or during non-cruise conditions such as climbs, takeoffs, descents and/or landings. In other words, while certain features or structures of the aircraft 100 may improve a first characteristic(s) or metric(s) (e.g., lift-to-drag ratio) of the aircraft 100 in some conditions, those features or structures may adversely affect a second characteristic(s) or metric(s) (e.g., bending loads on the wings 104 and 106) of the aircraft 100 in other conditions.

Structural reinforcements are often employed to enable the wings 104 and 106 of the aircraft 100 to withstand increased bending loads associated with high load factor conditions and/or maneuvers. However, structural reinforcements typically result in additional wing weight and, thus, increase fuel consumption and reduce fuel efficiency. Reduced fuel efficiency is undesirable for cost purposes (e.g., higher fuel burn per seat-mile) and environmental concerns (e.g., higher carbon dioxide per seat-mile). Moreover, the structural reinforcements previously employed to withstand increased bending loads may have adverse affects on the wings 104 and 106 in different conditions. For example, during periods of relatively low bending loads placed on the wings 104 and 106, the structural reinforcements can add excess aircraft weight that may increase induced drag of the aircraft 100.

Examples disclosed herein alleviate bending loads experienced by the wings 104 and 106 by simultaneously adapting a plurality of control surfaces according to a current and/or expected condition of the aircraft 100. In particular, examples disclosed herein detect one or more conditions indicative of increased bending loads on the wings 104 and 106 and, in response to the detected conditions, control a plurality of control surfaces of the wings 104 and 106 to alleviate the increased bending loads. Furthermore, examples disclosed herein prevent the bending load alleviation mechanisms from adversely affecting one or more other aspects or characteristics of the aircraft 100 when the bending load alleviation mechanisms are not crucial. In other words, examples disclosed herein enable the aircraft 100 to deploy the bending load alleviation mechanisms only when desired and/or necessary (e.g., beneficial beyond a threshold). As described in greater detail below, example load alleviation mechanisms and techniques disclosed herein include configurable ailerons (and/or spoilers) at trailing edges of the wings 104 and 106 that are simultaneously deflected in conjunction with configurable winglet control surfaces to reduce structural loads acting on various portions of the wings 104 and 106. That is, example load alleviation mechanisms and techniques disclosed herein coordinate deflection(s) of portions of the wings with deflection(s) of winglet surfaces of winglets that are adjacent to (e.g., mounted to) the wings. Moreover, as described in detail below, example load alleviation mechanisms and techniques disclosed herein can also be implemented to modify pressure fields above outboard wing portions that reduce drag during, for example, a climbing condition of a flight. For example, the mechanisms and techniques disclosed herein can be implemented to create a pressure field at a juncture of a wing and a winglet that beneficially affects a spanwise lift distribution on the wings for reduced draft in different flight conditions and, thus, reduces drag even when the aircraft is in a non-cruise condition.

Figure 2:
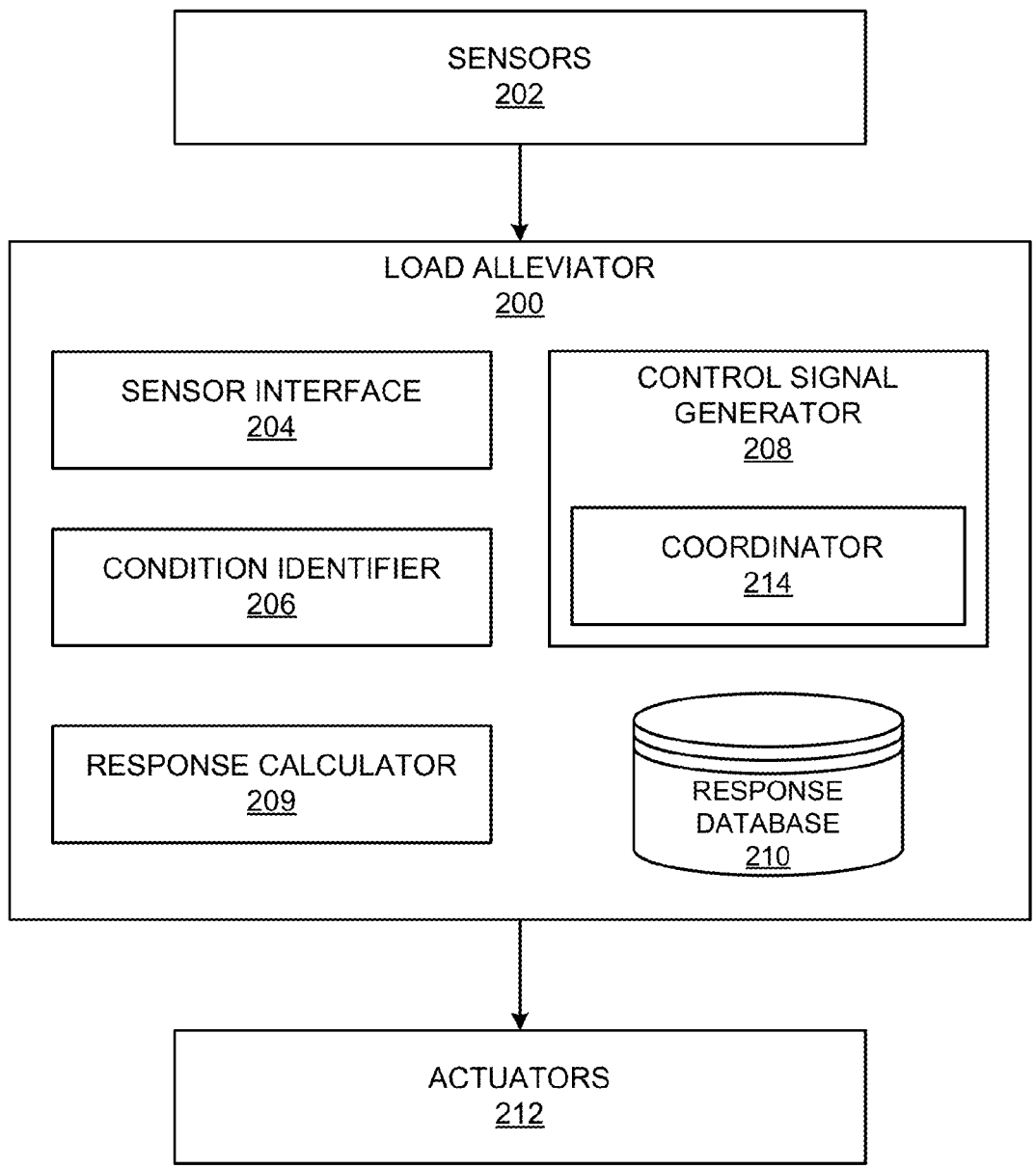
FIG. 2 is a block diagram of an example apparatus that may be used to implement an example load alleviator disclosed herein.

FIG. 2 is a block diagram of an example load alleviator 200 constructed in accordance with teachings of this disclosure. The example load alleviator 200 of FIG. 2 cooperates with, for example, ailerons and/or spoilers of the wings 104 and 106, and control surfaces of configurable winglets proximate the wings 104 and 106 to alleviate bending loads and to create modified pressure fields above outboard wing portions. In particular, the example load alleviator 200 of FIG. 2 manages coordinated manipulation of the control surface(s) of wings 104 and 106 and the control surface(s) of the winglets according to a condition and/or external factor experienced by the aircraft 100.

To identify one or more conditions of the aircraft 100 and/or one or more factors associated with the aircraft 100, the example load alleviator 200 receives signals from a plurality of sensors 202 that monitor respective aspects of the aircraft 100. The example sensors 202 of FIG. 2 include at least one of an air speed sensor, a gust sensor, an inertial load sensor or load factor sensor, a structural load sensor such as a load cell, a structural strain sensor, a rate gyro or equivalent sensor, a look-ahead sensor, an accelerometer, a dynamic pressure sensor, an altimeter, a Mach sensor, a fuel flow sensor and a pilot control input sensor such as a control column sensor, control wheel sensor, control stick sensor, sidestick sensor, and rudder pedal sensor. Additional or alternative types of sensors can provide information to the load alleviator 200. The example sensors 202 can also include a device(s) through which manual input can be entered by, for example, an operator associated with the aircraft 100. The example sensors 202 can also include one or more forecast devices and/or systems that provide the load alleviator 200 with information regarding predicted conditions, such as anticipated load factor, wind conditions, pressure conditions, and/or other weather related conditions.

The example load alleviator 200 includes a sensor interface 204 to receive signals received from the sensors 202 and/or alternative sources of information. In some examples, the example sensor interface 204 conditions the received signals for processing by other components of the load alleviator 200.

For example, the sensor interface 204 converts raw data provided by at least one of the sensors 202 into a format usable by a processor (e.g., a digital processor).

In the illustrated example, the sensor interface 206 conditions the received sensor signals for an example condition identifier 206. The example condition identifier 206 interprets the data provided via the sensor interface 204 to identify which of a plurality of defined conditions the aircraft 100 is currently experiencing or is expected to experience at a certain time (e.g., as derived by filter and/or algorithmic means). In some examples, the example condition identifier 206 uses a combination of the signals provided via the sensor interface 204 to identify one or more conditions. For example, information received from the sensor interface 204 includes one or more of load sensor information from an inertial reference sensor suite, wing load sensor information, wing strain sensor information, wing pressure and/or differential pressure sensor information, lookahead atmospheric sensor information that can anticipate gusts that will hit the wing before the gusts actually impact the wing, pitot pressure sensor information, static pressure sensor information, airspeed sensor information, Mach sensor information, rate gyro sensor information, altimeter sensor information, rate of climb data, pitch attitude data, flight path angle, etc. In some examples, the condition identifier 206 weights the individual signals to generate an aggregate condition indicator. Additionally or alternatively, the example condition identifier 206 may identify one or more conditions based on readings from individual ones of the sensors 202. Further, the example condition identifier 206 of FIG. 2 utilizes a plurality of thresholds and/or ranges that are compared to, for example, aggregate and/or individual readings from the sensors 202. Each of the thresholds and/or ranges corresponds to one or more of the defined conditions or modes of operation to be identified by the example condition identifier 206. In other words, if reading(s) from the sensors 202 meet corresponding thresholds or ranges, the example condition identifier 206 determines that the aircraft 100 is in or is about to be in the corresponding conditions and/or modes.

Example conditions to be identified by the example condition identifier 206 include high load conditions, such as a high load maneuver condition and/or a high gust load condition, and/or mode of operation conditions, such as a cruise condition or a non-cruise condition. In the illustrated example, at least one of the example conditions to be identified has a corresponding threshold managed by the condition identifier 206. For example, the aircraft 100 may fly at a 1 G load factor in which lift exactly balances the weight of the aircraft 100. Some wings (e.g., the wings 104 and 106 of FIG. 1A) are designed with sufficient structural strength and stiffness to function without damage up to a limit load condition of 2.5 G load factor. In such instances, the example condition identifier 206 is configured to determine that a high load condition exists when the sensor information indicates a load factor of, for example, above 1.4 G. Thus, corresponding threshold(s) managed by the example condition identifier 206 are set such that the threshold(s) are met or exceeded by sensor readings associated with the 1.4 G condition.

Additionally or alternatively, the example condition identifier 206 is configured to determine that a high gust load condition exists when wind speed sensor information is indicative of gusts above a certain velocity or energy level that causes increased bending loads. In such instances, corresponding threshold(s) managed by the example condition identifier 206 are set such that the threshold(s) are met or exceeded by sensor readings associated with the high gust conditions. The example condition identifier 206 may also configure a threshold corresponding to expected gust conditions to be met or exceeded should a forecast element of the sensors 202 indicative that gusts above a certain velocity are expected. For example, forward looking sensors (e.g., LIDAR (Light Detection and Ranging)) capable of detecting gusts ahead of the aircraft 100 that the aircraft 100 is likely to fly into can be utilized in connection with the example condition identifier 206 of FIG. 2.

Additionally or alternatively, the example condition identifier 206 is configured to determine whether the aircraft 100 is in a cruise condition or a non-cruise condition or mode. In the illustrated example, the condition identifier 206 bases such a determination on information received from the sensors 202 and/or direct input from, for example, a guidance system of the aircraft 100. That is, the example condition identifier 206 can determine whether the aircraft 100 is in a cruise or non-cruise condition or mode based on sensed information or data regarding a mode of operation of the aircraft 100.

Additionally or alternatively, the example condition identifier 206 may receive data regarding an upcoming maneuver to be taken by the aircraft 100 or a maneuver that has begun. For example, the condition identifier 206 can be informed (e.g., via the sensors 202, a control input and/or communication from a pilot, guidance system, etc.) that the aircraft 100 is about to perform or has begun performing a high G maneuver that will place an increased bending load on the wings 104 and 106. In the illustrated example, the condition identifier 206 is configured to determine that a high maneuver load condition exists when sensor information (e.g. control column, control stick or sidestick sensor information such as position or force) is indicative of maneuver loads above a certain level that causes increased wing bending loads. In such instances, corresponding threshold(s) managed by the example condition identifier 206 are set such that the threshold(s) are met or exceeded by sensor readings associated with the high maneuver load conditions. The example condition identifier 206 may also configure a threshold corresponding to expected maneuver conditions to be met or exceeded should a forecast element of the sensors 202 indicative that maneuver(s) above a certain level are expected.

Thus, the example condition identifier 206 is configured to identify current conditions, upcoming conditions, expected conditions, etc. that have an effect on, for example, bending loads and/or drag characteristics of the aircraft 100. In the example of FIG. 2, the example condition identifier 206 conveys an indication of the one or more detected conditions to a control signal generator 208. The example control signal generator 208 references at least one of a response calculator 209 and a response database 210 to obtain instructions regarding a manner in which the load alleviator 200 is to respond to the detected condition(s). The example response calculator 209 includes one or more mathematical operations (e.g., algorithms such as a Kalman filter algorithm, a time jerk algorithm, a proportional control algorithm, an integral-proportional control algorithm, etc.) corresponding to desired responses to the defined conditions to be detected by the condition identifier 206. That is, the example response calculator 209 receives inputs associated with the detected conditions and generates output(s) representative of a manner in which the load alleviator 200 is to respond. The example response database 210 includes a plurality of entries corresponding to the plurality of defined conditions to be detected by the condition identifier 206. As described above, the example condition identifier 206 utilizes information provided via the sensors 202 and/or alternative sources (e.g., a guidance system of the aircraft 100) to determine whether the aircraft 100 is in one or more defined conditions and/or modes. Each condition has a corresponding entry in the example response database 210 and/or a resultant of the operations of the response calculator 209 of FIG. 2. The entries of the database 210 and/or the output(s) of the response calculator 209 also include a corresponding instruction(s) for operation of, for example, the control surfaces of the wings 104 and 106. As described in greater detail below in connection with FIGS. 3-6, the example responses provided by the example load alleviator 200 correspond to control surface configurations disclosed herein that, for example, reduce bending loads experienced by the wings 104 and 106 and/or create modified pressure zones at outboard portions of the wings 104 and 106 to reduce drag in varied flight conditions. For example, a first one of the responses of the calculator 209 and/or the database 210 corresponds to a high load condition (e.g., a high load factor maneuver being performed or a high gust condition) and includes deflecting a control surface of the wings 104 and 106 in coordination with a deflection of a control surface a winglet. Further, a second example one of the responses of the calculator 209 and/or the database 210 corresponds to a certain mode of flight (e.g., a non-cruise mode, such as a climbing mode) and includes deflecting a control surface of the wings 104 and 106 in coordination with a deflection of a control surface of a winglet. In some examples, the manner of deflecting the control surfaces of the wing and/or the winglet in the first response differs from the second response. In other words, one or more aspects of the coordinated deflections disclosed herein may vary depending on, for example, whether a detected high load condition triggered the response or a detected mode of flight triggered the response. Additional or alternative differences are possible.

When the example control signal generator 208 obtains the appropriate response(s) to the detected condition(s) and/or mode(s), the example control signal generator 208 conveys corresponding signals to one or more actuators 212 associated with the control surfaces of the aircraft 100. The example actuators 212 of FIG. 2 include electrically powered actuators (e.g., an electromechanical actuator (EMA) or electrohydraulic actuator (EHA)), hydraulic actuators, pneumatic actuators, shape memory alloy actuators, and/or any other suitable type of actuator. The example actuators 212 are in communication with and are configured to operate a plurality of control surfaces of the aircraft 100. The example control surfaces associated with the example load alleviator 200 of FIG. 2 and the actuation thereof in accordance with the teachings of this disclosure are described in detail below in connection with the FIGS. 3-6.

In some examples disclosed herein, the control signal generator 208 is tasked with a simultaneous or otherwise coordinated actuation of multiple ones of the control surfaces of the aircraft 100. To perform such a task, the example control signal generator 208 includes a coordinator 214. The example coordinator 214 of FIG. 2 determines whether a response obtained from the example calculator 209 or the example response database 210 includes a coordinated actuation of more than one control surface of the aircraft 100. For example, to reduce a bending load experienced by the right wing 104 during a maneuver having a high G factor, both an outboard aileron of a wing and a configurable surface of a winglet adjacent to (e.g., mounted to) the wing may be simultaneously deflected (as described in detail below). In such instances, the example coordinator 214 synchronizes the actuations of the multiple control surfaces.

Thus, the example load alleviator 200 enables the aircraft 100 to respond to different conditions (e.g., high load factor maneuvers and/or high gust factor conditions) and/or the aircraft 100 being in different modes (e.g., in a cruise mode or in a non-cruise mode) by configuring the aircraft 100 to operate more efficiently.

While an example manner of implementing the load alleviator 200 has been illustrated in FIG. 2, one or more of the elements, processes and/or devices illustrated in FIG. 2 may be combined, divided, re-arranged, omitted, eliminated and/or implemented in any other way. Further, the example sensor interface 204, the example condition identifier 206, the example control signal generator 208, the example response calculator 209, the example coordinator 214, and/or, more generally, the example load alleviator 200 of FIG. 2 may be implemented by hardware, software, firmware and/or any combination of hardware, software and/or firmware. Thus, for example, any of the example sensor interface 204, the example condition identifier 206, the example control signal generator 208, the example response calculator 209, the example coordinator 214, and/or, more generally, the example load alleviator 200 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), analog computers, digital computers, etc. When any of the appended system or apparatus claims of this patent are read to cover a purely software and/or firmware implementation, at least one of the example sensor interface 204, the example condition identifier 206, the example control signal generator 208, the example response calculator 209, the example coordinator 214, and/or, more generally, the example load alleviator 200 of FIG. 2 are hereby expressly defined to include a tangible computer readable storage medium such as a memory, DVD, CD, Blu-ray, etc. storing the software and/or firmware. Further still, the example load alleviator 200 of FIG. 2 may include one or more elements, processes and/or devices in addition to, or instead of, those illustrated in FIG. 2, and/or may include more than one of any or all of the illustrated elements, processes and devices.

FIGS. 3A-E illustrate an example aircraft 300 constructed in accordance with the teachings of this disclosure. The example aircraft 300 of FIGS. 3A-C includes a plurality of configurable control surfaces configured to, for example, reduce bending loads on wings 302 and 304 and/or to create modified pressure zones of certain portions of the wings 302 and 304 to reduce drag. The example aircraft 300 of FIG. 3A also includes or is in communication with an implementation of the example load alleviator 200 of FIG. 2 to operate and coordinate the example configurable control surfaces when certain conditions of the aircraft 300 are detected. The example control surfaces of FIGS. 3A-3E are configurable in that one or more of the actuators 212 of FIG. 2 can adjust the position (e.g., angular position) of the control surfaces relative to, for example, a base portion of the wings 302 and 304, a fuselage 306, other ones of the control surfaces, etc.

FIG. 3A is a plan view of a portion of the example aircraft 300. The wings 302 and 304 of FIG. 3A each have an inboard portion 308 and an outboard portion 310. The inboard portions 308 of the wings 302 and 304 are closer to the fuselage 306 than the outboard portions 310. Example control surfaces of the right wing 304 in FIG. 3A include a leading edge high lift device 312, a trailing edge high lift device 314, a plurality of spoilers 316, and an aileron 318. Similar control surfaces are found on the left wing 302. The example aircraft 300 of FIG. 3A also includes winglets 320 mounted to or otherwise integrated with the wings 302 and 304 at the ends of the outboard portions 310 of the wings 302 and 304. The example winglets 320 include configurable surfaces that can be deflected. As described in detail below, the example load alleviator 200 of FIG. 2 coordinates deflections of the aileron 318 and deflections of the winglet surface(s) 320 in response to detected one or more of the defined conditions of the aircraft 300.

FIG. 3B is a partial front view of the example aircraft 300 of FIG. 3A. The left and right wings 302 and 304 are coupled to the fuselage 306 and extend outwardly. As shown in the example view of FIG. 3B, the example control surfaces of the aircraft 300 are in a base or neutral position (e.g., the spoilers 316, the ailerons 318 and the configurable surfaces of the winglets 320 are not deflected). Such a configuration may correspond to, for example, a scenario in which the example load alleviator 200 of FIG. 2 detects the aircraft 300 being in a cruise condition with normal (e.g., not above a threshold or within a range) gusts. In other words, the configuration of FIG. 3B may result from the example load alleviator 200 of FIG. 2 determining that a high load condition does not currently exist and that the current mode of the aircraft 300 is a cruise mode. The example configuration of FIG. 3B may correspond to additional or alternative determinations of the example load alleviator 200.

Figure 3C:
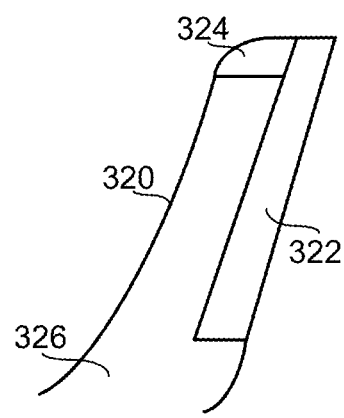
FIG. 3C is a side view of an example winglet of the example pair of wings of FIGS. 3A and 3B.

FIG. 3C is a side view of the example winglets 320 of FIGS. 3A and 3B. The example winglets 320 are located at the ends of the outboard portions 310 of the wings 302 and 304. The example winglet 320 of FIG. 3C includes a configurable trailing edge surface 322 and a configurable tip horn 324. In some examples, the winglet 320 does not include the tip horn 324. The trailing edge surface 322 and the tip horn 324 of the example winglet 320 are configurable in that one or more of the actuators 212 of FIG. 2 can adjust the position (e.g., angular position) of the surfaces 322 and 324 relative to, for example, a base portion 326 of the winglet 320. In some examples, the winglet 320 includes a body portion to which the trailing edge surface 322 is coupled via, for example, one or more hinges. In some examples, the winglet 320 is configured such that the winglet 320 can be reversibly canted inboard to reduce the total wingspan of the aircraft 300 to meet gate clearance requirements (e.g., while on the ground). Additionally or alternatively, the example winglet 320 can include a shape memory alloy (SMA) and/or an SMA torque tube to change the shape of the winglet 320.

The example winglets 320 of the illustrated example may be implemented by the winglets disclosed in U.S. Pat. No. 7,744,038, filed on Jun. 15, 2007, entitled "Controllable Winglets." U.S. Pat. No. 7,744,038 is incorporated herein by reference in its entirety.

Figure 3D:
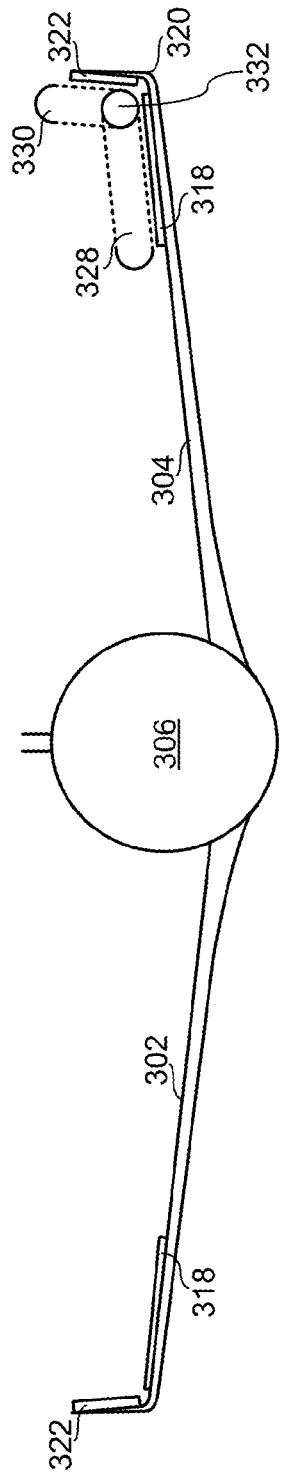
FIG. 3D is a front view of the example pair of wings of FIG. 3A in a second example configuration.

FIG. 3D illustrates the example aircraft 300 when the example load alleviator 200 of FIG. 2 has detected (e.g., via the sensor interface 204 and the condition identifier 206) a high load condition, such as a high load factor maneuver and/or a high gust condition. Alternatively, the example of FIG. 3D may correspond to an instance of the example load alleviator 200 of FIG. 2 determining (e.g., via the sensor interface 204 and the condition identifier 206) that the aircraft 300 is in a certain mode or stage of flight, such as a non-cruise mode. In other words, the example of FIG. 3D corresponds to, for example, one or more conditions or modes during which an increased bending load is experienced by the wings 302 and 304 and/or a suboptimal span-wise load distribution exists.

In the example of FIG. 3D, the response obtained by the example control signal generator 208 of FIG. 2 from the example response calculator 209 or the example response database 210 includes instructions for the ailerons 318 of the wings 302 and 304 to be deflected in coordination with the trailing edge control surfaces 322 of the winglets 320.

Accordingly, the example control signal generator 208 and/or the example coordinator 214 provide signals to ones of the actuators 212 associated with the ailerons 318 and the trailing edge surfaces 322 of the winglets 320. As shown in FIG. 3D, the ailerons 318 and the trailing edge surfaces of the winglets 320 are deflected accordingly. In particular, the actuators 212 deflect the trailing edges of the ailerons 318 upward (e.g., relative to a neutral position). Further, the actuators 212 deflect the trailing edges of the control surfaces 322 of the winglets 320 inward (e.g., relative to a neutral position). The example coordinator 214 ensures that the deflections occur simultaneously or otherwise in coordination. This configuration of the control surfaces 318, 322 reduces the bending loads experienced by the wings 302 and 304.

Further, the configuration of control surfaces shown in FIG. 3D creates modified pressure field above the outboard portions 310 of the wings 302 and 304. In particular, the upward deflection of the ailerons 318 creates a first modified pressure field 328 extending from the winglets 320 along the wings 302 and 304 towards the fuselage 306. The inward deflection of the trailing edge surfaces 322 of the winglets 320 creates a second modified pressure field 330 inboard of the winglets 320. As shown in FIG. 3D, the first pressure field 328 and the second pressure field 330 are non-colinear. Further, a third modified pressure field 332 is created by the combination of coordinated control deflections, with this third modified pressure field 332 proximate to a juncture of the winglet 320 and the outboard portion 310 of the wings 302 and 304. In different flight conditions, such as 1 G climb or descent or other non-cruise conditions, for example, the pressure fields 328-332 created by the example load alleviator 200 and the corresponding control surfaces can be tailored to affect a span-wise lift distribution on the wings 302 and 304 for drag reduction. Thus, the modification of the pressure fields disclosed herein reduce drag even when the aircraft 300 is in, for example, a non-cruise condition. In contrast, previous aircraft were designed to reduce drag during cruise conditions at the expense of drag factors during non-cruise conditions. For example, previous aircraft include one or more mechanisms that reduce drag during cruise conditions but cause suboptimal span-wise load distribution during a climb phase of flight. Use of the example load alleviator 200 of FIG. 2 to create the beneficial pressure fields described above remedies the suboptimal span-wise load distribution experienced by previous aircraft during non-cruise conditions. Moreover, the example pressure fields 328-332 can be further tailored with combined roll or yaw commands to assist the aircraft 300 in creating an incremental rolling moment and/or an incremental yawing moment when desired.

Figure 3E:
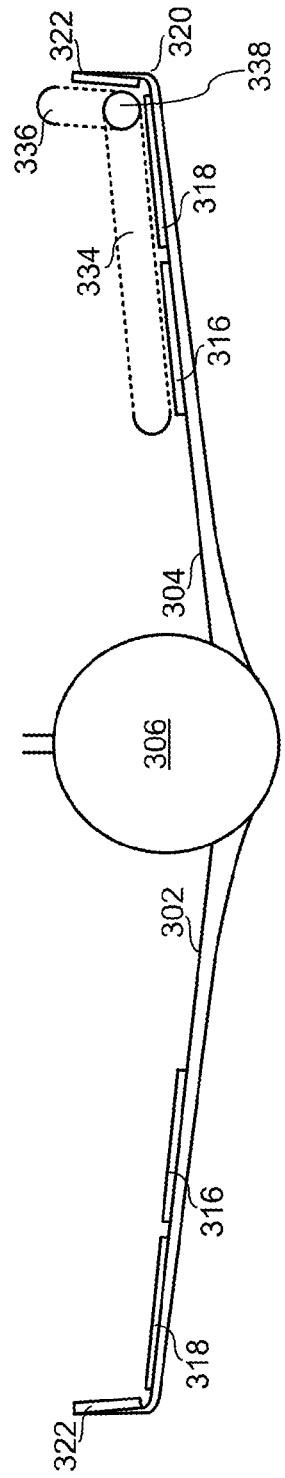
FIG. 3E is a front view of the example pair of wings of FIG. 3A in a third example configuration.

FIG. 3E illustrates an instance of the example load alleviator 200 causing one or more of the outboard spoilers 316 of the wings 302 and 304, along with the ailerons 318 of the wings 302 and 304, to be deflected in coordination with the control surfaces 322 of the winglets 320. The example spoiler (s) 316 that are deflected per the example load alleviator 200 in FIG. 3E are closer to the fuselage 306 than the ailerons 318 that are deflected. As a result of the coordinated deflections of FIG. 3E, a first modified pressure field 334 is created above the spoiler(s) 316 and the ailerons 318. Further, a second modified pressure field 336 is created inside the winglet 320 as a result of the deflection of the control surface 322 of the winglet 320. Further, a third modified pressure field 338 is created near a juncture of the winglet 320 and the outboard portion 310 of the wings 302 and 304.

Figure 4A:
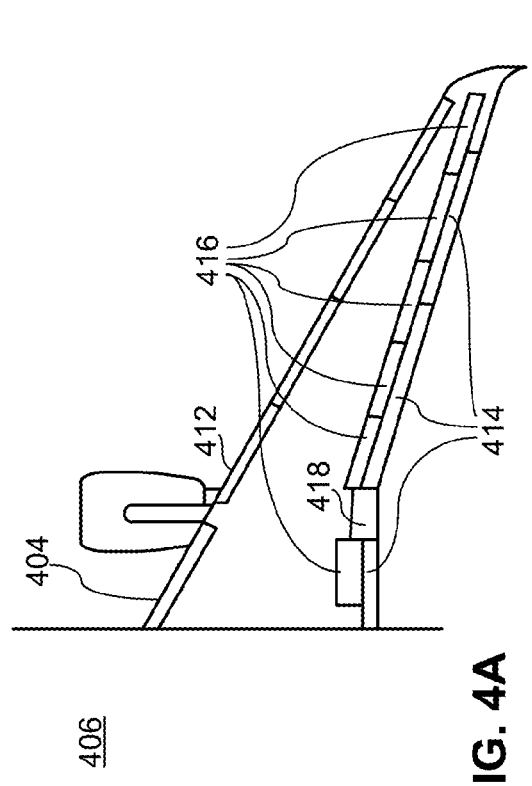
FIG. 4A is a plan view an example pair of wings having control surfaces deflected in accordance with the example wing load alleviator of FIG. 2.
Figure 4B:
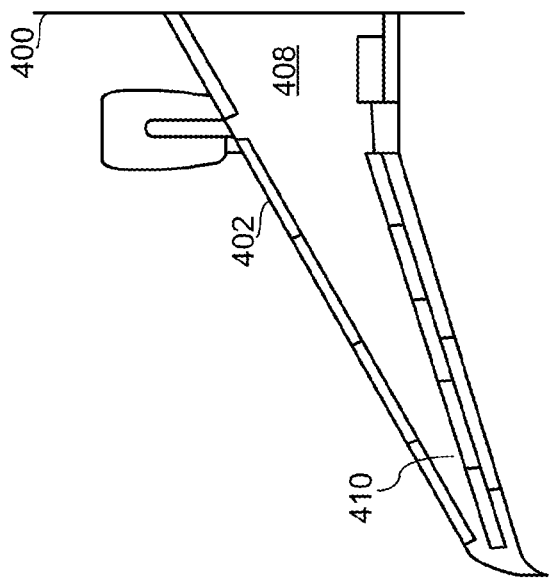
FIG. 4B is a front view of the example pair of wings of FIG. 4A.

FIGS. 4A and 4B illustrate another example aircraft 400 constructed in accordance with the teachings of this disclosure. The example aircraft 400 of FIGS. 4A-4B includes or is in communication with an implementation of the example load alleviator 200 of FIG. 2 to operate and coordinate example configurable control surfaces when certain conditions of the aircraft 400 are detected, such as a high load condition or certain mode(s) of operation.

FIG. 4A is a plan view of a portion of the example aircraft 400. The aircraft 400 has a fuselage 406 and wings 402 and 404 each having an inboard portion 408 and an outboard portion 410. The right wing 404 of the example aircraft 400 of FIG. 4A includes a leading edge high lift device 412, a trailing edge high lift device 414, a plurality of spoilers 416, and an aileron 418. In the example of FIG. 4A the ailerons 418 are inboard of the spoilers 416. Similar control surfaces are found on the left wing 402. The example aircraft 400 of FIG. 4A also includes winglets 420 mounted to or otherwise integrated with the wings 402 and 404 at the ends of the outboard portions 410 of the wings 402 and 404. The example winglets 420 include configurable surfaces that can be deflected. As described in detail below, the example load alleviator 200 of FIG. 2 coordinates deflections of the spoilers 416 and deflections of the winglet surface(s) 420 in response to detected one or more of the defined conditions and/or modes of the aircraft 400.

FIG. 4B is a partial front view of the example aircraft 400 of FIG. 4A when the example load alleviator 200 of FIG. 2 has detected (e.g., via the sensor interface 204 and the condition identifier 206) a high load condition, such as a high load factor maneuver and/or a high gust condition. Alternatively, the example of FIG. 4B may correspond to an instance of the example load alleviator 200 of FIG. 2 determining (e.g., via the sensor interface 204 and the condition identifier 206) that the aircraft 300 is in a certain mode or stage of flight, such as a non-cruise mode. In other words, the example of FIG. 4B corresponds to, for example, one or more conditions or modes during which an increased bending load is experienced by the wings 402 and 404 and/or a suboptimal span-wise load distribution exists.

In the example of FIG. 4B, the response obtained by the example control signal generator 208 of FIG. 2 from the example response calculator 209 or the example response database 210 includes instructions for the spoilers 416 of the wings 402 and 404 to be deflected in coordination with trailing edge control surfaces 422 of the winglets 420. Accordingly, the example control signal generator 208 and/or the example coordinator 214 provide signals to ones of the actuators 212 associated with the spoilers 416 and the trailing edge surfaces 422 of the winglets 420. As shown in FIG. 4B, the spoilers 416 and the trailing edge surfaces 422 of the winglets 420 are deflected accordingly. In particular, the actuators 212 deflect the spoilers 416 upward (e.g., relative to a neutral position). Further, the actuators 212 deflect the trailing edges of the control surfaces 422 of the winglets 420 inward (e.g., relative to a neutral position). The example coordinator 214 ensures that the deflections occur simultaneously or otherwise in coordination. This configuration of the control surfaces 416, 422 reduces the bending loads experienced by the wings 402 and 404. Further, the configuration of control surfaces shown in FIG. 4B creates pressure fields 424 and 426 and a pressure field 428 at a juncture of the winglets 420 and the wings 402 and 404. As described above, the example pressure fields 424-428 of FIG. 4B can be tailored to positively affect a span-wise lift distribution on the wings 402 and 404 and, thus, reduce drag even when the aircraft 400 is in, for example, a non-cruise condition.

Further, the pressure fields 424-428 assist the aircraft 400 in creating an incremental rolling moment and/or an incremental yawing moment when desired. For example, the first and second winglets 420 on opposing ones of the wings 402 404 can be deflected in differently to create an asymmetric deflection of the control surfaces to augment at least one of a rolling moment acting on the aircraft 400 or a yawing moment acting on the aircraft 400. In some examples, incremental signals are provided to the actuators 212 for differential actuation of the control surfaces of the first and second winglets to augment at least one of the rolling moment and the yawing moment acting on the aircraft 400.

Figure 5:
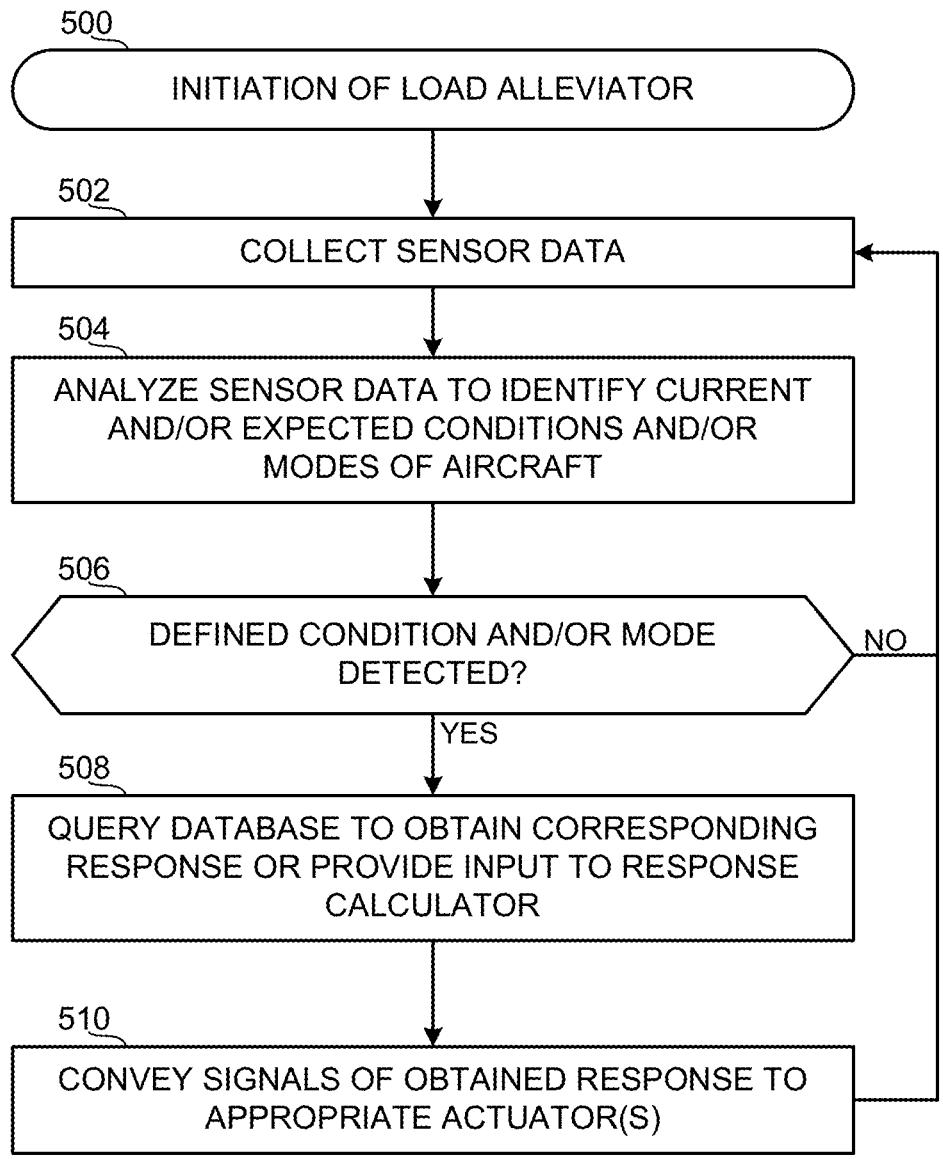
FIG. 5 is a flowchart representative of an example method that may be performed to implement the example load alleviator of FIG. 2.

FIG. 5 is a flowchart representative of an example method for implementing the example load alleviator 200 of FIG. 2. In the example flowchart of FIG. 5, the method may be implemented using machine readable instructions that comprise program(s) for execution by a processor such as the processor 612 shown in the example computer 600 discussed below in connection with FIG. 6. The program(s) may be embodied in software stored on a tangible computer readable medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is described with reference to the flowchart illustrated in FIG. 5, many other methods of implementing the example load alleviator 200 may alternatively be used. For example, the order of execution of the blocks may be changed, and/or some of the blocks described may be changed, eliminated, or combined.

As mentioned above, the example operations of FIG. 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example operations of FIG. 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example method of FIG. 5 begins with an initiation of the example load alleviator 200 of FIG. 2 (block 500) in connection with an aircraft, such as the aircraft 300 of FIG. 3. The example load alleviator 200 can be initiated before or during a flight. When active, the example sensor interface 204 begins processing data received from the sensors 202 associated with the aircraft 300 (block 502). The data is provided to the example condition identifier 206, which analyzes the sensor data to determine whether one or more of a set of defined conditions and/or modes of operations current exist or are expected to exist in the near future (block 504). As described above, this analysis includes, for example, a plurality of comparisons to one or more individual and/or aggregate thresholds or ranges corresponding to the defined conditions and/or modes of operation.

If the sensor data is indicative of normal conditions (e.g., does not correspond to one of the defined conditions of the example load alleviator 200) (block 506), control returns to block 502 and additional, updated sensor data is collected and processed. On the other hand, if one of the defined conditions (e.g., a high load factor maneuver condition or a non-cruise mode of operation) is detected via the example condition identifier (block 506), the example control signal generator 208 provides input to the response calculator 209 or queries the response database 210 to obtain the corresponding response(s) for the detected conditions and/or modes (block 508). The example control signal generator 208 analyzes the obtained response information to generate and convey the appropriate signals to the corresponding actuators 212 (block 510). As a result, the appropriate control surfaces of the aircraft, such as the ailerons 318 and the winglet control surfaces 322, are deflected (e.g., upwardly and inwardly, respectively) to, for example, reduce bending loads on the wings 302 and 304, create pressure fields at outboard positions for remedying suboptimal span-wise load distribution on the wings, create an incremental rolling moment, create an incremental yawing moment, etc.

Figure 6:
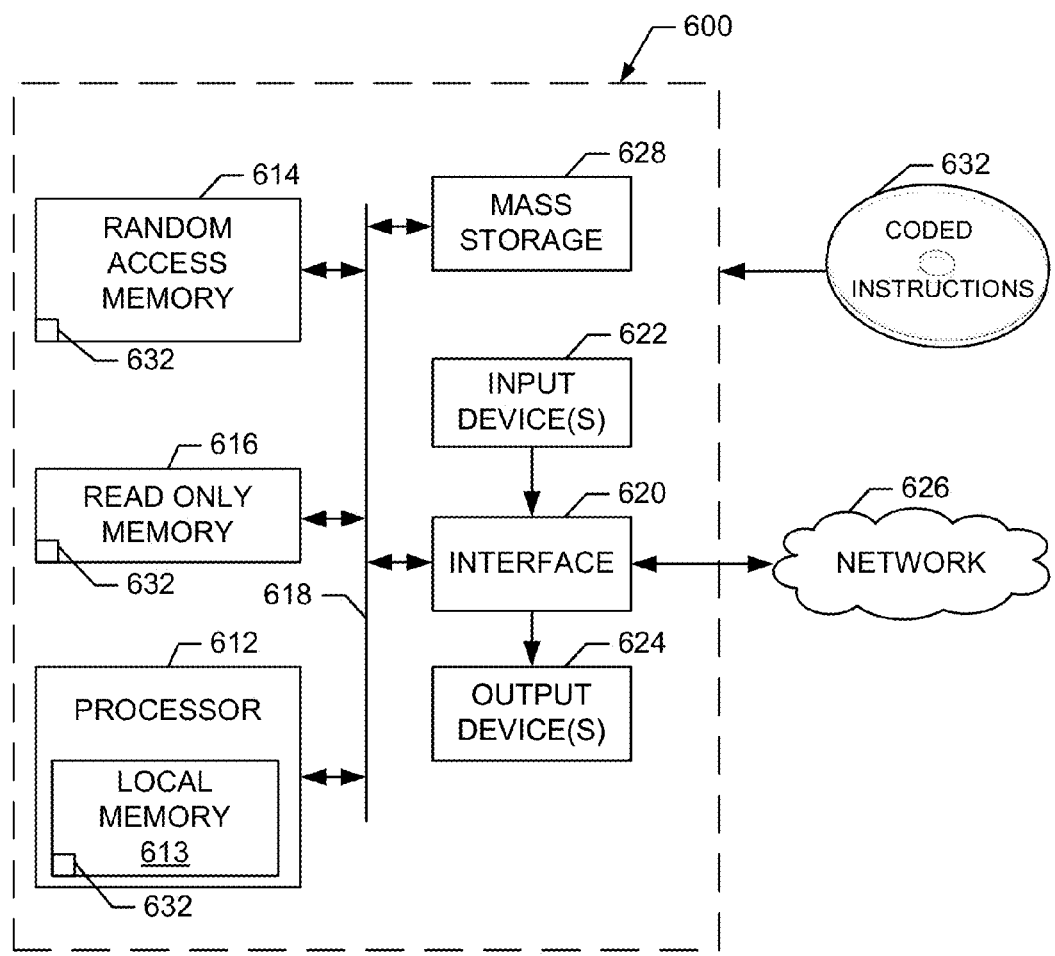
FIG. 6 is a block diagram of an example processing system capable of executing example machine readable instructions to implement the example load alleviator 200 of FIG. 2 and the example method of FIG. 5.

FIG. 6 is a block diagram of a processor platform 600 capable of executing instructions to implement the example method of FIG. 5 and the example load alleviator 200 of FIG. 2. The processor platform 600 can be, for example, a server, a personal computer, an Internet appliance, a DVD player, a CD player, a Blu-ray player, a gaming console, a personal video recorder, a smart phone, a tablet, a printer, or any other type of computing device.

The processor platform 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives.

Coded instructions 632 to implement the example method of FIG. 5 may be stored in the mass storage device 628, in the volatile memory 614, in the non-volatile memory 616, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
    collecting first data related to a condition of an aircraft;
    when a condition identifier implemented via a logic circuit indicates that the condition exists, automatically generating a plurality of control signals to coordinate a first deflection of a first control surface and a second deflection of a second control surface; and
    collecting second data related to a mode of the aircraft and, when the mode is a non-cruise mode, coordinating a third deflection of the first control surface and a fourth deflection of the second control surface.

2. The method as defined in claim 1, wherein coordinating the first and second deflections comprises deflecting the first and second control surfaces simultaneously.

3. The method as defined in claim 1, further comprising coordinating the first and second deflections to generate a modified pressure field at a juncture of a winglet and a wing.

4. The method as defined in claim 1, wherein the non-cruise mode comprises a climbing mode.

5. The method as defined in claim 1, wherein the first deflection is different from the third deflection.

6. The method as defined in claim 1, wherein the second deflection is different from the fourth deflection.

7. An apparatus, comprising:
    a condition identifier to, via a logic circuit, determine a mode of an aircraft; and
    a signal generator to respond to the determined mode of the aircraft by conveying signals to actuators of the aircraft, wherein the signal generator is to respond to the mode being a flight condition mode comprising a non-cruise mode by:
        conveying a first signal to a first actuator associated with a first control surface of a wing to cause the first control surface to deflect; and
        conveying a second signal to a second actuator associated with a winglet to cause a second control surface of the winglet to deflect.

8. The apparatus as defined in claim 7, further comprising at least one of:
    a response calculator to generate responses to different conditions or modes of the aircraft; and a response database to store a plurality of responses corresponding to different conditions or modes of the aircraft.

9. The apparatus as defined in claim 8, wherein at least one of the responses includes coordination information indicative of a relationship between the deflection of the first control surface and the deflection of the second control surface.

10. The apparatus as defined in claim 7, wherein the condition identifier is to factor an expected condition into a determination of a condition of the aircraft.

11. The apparatus as defined in claim 7, wherein the first signal is to cause the first control surface to deflect upwards and the second signal is to cause the second control surface to deflect inwards.

12. The apparatus as defined in claim 7, wherein the first and second deflections are to cause a modified pressure field at a juncture of the winglet and the wing.

13. An aircraft, comprising:
a winglet having a first control surface, the winglet being mounted to a wing;
a second control surface;
a sensor to collect data related to a condition of the aircraft; and
a signal generator to coordinate a deflection of the first control surface of the winglet and a deflection of the second control surface in response to a detection of the condition.

14. The aircraft as defined in claim 13, wherein the second control surface comprises an outboard spoiler.

15. The aircraft as defined in claim 13, wherein the second control surface comprises an aileron at a trailing edge of the wing.

16. The aircraft as defined in claim 13, wherein the first control surface is to be deflected inward and the second control surface is to be deflected upward in response to a high load condition.

17. The aircraft as defined in claim 13, wherein deflecting the first and second control surfaces in the coordinated manner includes deflecting the first and second control surfaces simultaneously.

18. The aircraft as defined in claim 13, wherein the first and second control surfaces are to be deflected in response to the aircraft being in a non-cruise mode.

19. The aircraft as defined in claim 13, wherein the condition includes at least one of a high load factor maneuver or a high gust.

* * * * *